United States Patent [19]
Hartouni

[11] Patent Number: 5,111,525
[45] Date of Patent: May 5, 1992

[54] SPLIT-CORE FIBER OPTIC WAVEGUIDE AND SENSOR

[75] Inventor: Edward Hartouni, Pomona, Calif.

[73] Assignee: General Dynamics Corporation, Pomona, Calif.

[21] Appl. No.: 597,126

[22] Filed: Oct. 15, 1990

[51] Int. Cl.⁵ .............................. G02B 6/22
[52] U.S. Cl. ...................... 385/126; 385/12
[58] Field of Search .............. 350/96.29, 96.3, 96.33; 65/3.11; 385/126, 123, 129

[56] References Cited

U.S. PATENT DOCUMENTS

| | | | |
|---|---|---|---|
| 3,887,264 | 6/1975 | Kompfner | 350/96.33 |
| 4,295,738 | 10/1981 | Meltz et al. | 366/32 |
| 4,295,739 | 10/1981 | Meltz et al. | 356/43 |
| 4,298,794 | 11/1981 | Snitzer et al. | 250/227 |
| 4,461,536 | 7/1984 | Shaw et al. | 350/96.15 |
| 4,529,426 | 7/1985 | Pleibel et al. | 65/3.11 |
| 4,711,525 | 12/1987 | Feth | 350/96.33 |

FOREIGN PATENT DOCUMENTS 59-81502 12/1984 Japan .................. 65/3.11

OTHER PUBLICATIONS

*Single-Mode Fibre Optic Directional Coupler*, Electronics Letters, vol. 16, No. 7, pp. 260–261, Mar. 27, 1980.

Primary Examiner—John D. Lee
Assistant Examiner—John Ngo
Attorney, Agent, or Firm—Neil Martin; Leo R. Carroll

[57] ABSTRACT

An improved optical fiber suitable for use as a distributed sensor of variations in either hydrostatic pressure or temperature having two substantially hemi-cylindrical optical glass cores, the first said core having a first index of refraction and the second said core having a second index of refraction, separated by a layer of optical glass having a third index of refraction, and an outer optical glass sheath having a fourth index of refraction. The split-core optical fiber can be fabricated so that cross-talk between the two halves of the split-core is a function of hydrostatic pressure or of temperature variations. The method of fabricating a split-core fiber includes the steps of inserting a flat strip of optical glass between the cleaved surfaces of two hemi-cylindrical optical glass cores to form a three-piece assembly, inserting said assembly into a cylinder of optical glass in a lengthwise direction to form a four-piece assembly, and heating and drawing said four-piece assembly to form an annealed split-core fiber of the desired circumference, where the thickness of said flat strip is chosen to provide the desired split-core separation after said step of heating and drawing. The split-core fiber may have a different index of refraction for each of the two half-cores and/or an index of refraction for the separating layer that is different from the index of refraction for the cladding layer. This flexibility provides many new options to the fiber optic sensor designer.

2 Claims, 3 Drawing Sheets

SPLIT-CORE FIBER OPTIC WAVEGUIDE AND SENSOR

BACKGROUND OF THE INVENTION

1. Field of the Invention

The disclosed invention involves relates to optical waveguides, and more particularly to, optical waveguides useful for sensing temperature and pressure changes by monitoring the effects on coupling between transmission modes in the optical waveguide core.

2. Description of Related Art

The usefulness of distributed fiber-optic systems is well known in the art. These systems are formed by combining fiber sensing and fiber telemetry features. Typical approaches to the distributed system may be categorized as being either intrinsic distributed or quasi-distributed. Intrinsic distributed sensing uses a single length of fiber to form an extended sensor element which senses the measureand field continuously over its entire length. Quasi-distributed sensing uses discrete sensor elements arranged in a linear array or some other useful network topology.

Intrinsic distributed sensors are particularly attractive for applications where monitoring of a single measureand (such as temperature or hydrostatic pressure) is required at a large number of points or continuously over the path of the fiber. Application examples include stress monitoring for real-time evaluation of structural integrity of mobile platforms or buildings; temperature profiling in electrical power transformers, transmission lines and generators; and simple intrusion detection systems. Intrinsic distributed sensing is particularly useful for development of "intelligent" structures by embedding continuous sensors in "smart" patterns within composite materials.

Quasi-distributed sensors and sensor networks are useful for monitoring single measureands but may be more useful for multi-measureand monitoring by selecting different sensors for different measureands within an array. Applications include process control, and mobile platform performance monitoring. Quasi-distributed sensor networks are not limited to the use of fiber-optics for sensors and may combine them with other sensors in a discrete arrangement.

Both intrinsic distributed and quasi-distributed fiber optic sensor systems require either distributed sensors or individual sensor elements together with scanning and addressing techniques. Intrinsic distributed sensors typically use either basic loss or scattering mechanisms to sense a measureand in a single length of optical fiber, which forms an extended sensor. The most basic form of an intrinsic-distributed sensor relies on the detection of regions of localized increases in loss, caused by microbending in a length of fiber, by direct Optical Time-Domain Reflectometry (OTDR) analysis of the Rayleigh-backscattered light. This is useful as a disturbance location sensor for simple intrusion detection systems. Another such sensor uses the change in the Rayleigh-scattering coefficient with temperature to perform distributed temperature sensing. In general, this dependance is extremely weak in solid core fibers.

One method known in the art for improving the sensitivity of optical fibers to changes in temperature and stress uses an optical fiber comprising two or more cores having refractive indices different from the cladding material. The exact spacing separating the cores, the number of cores, and the refractive prefiles are critical to the optimum performance of such a sensor. These parameters are critical because the sensing function relies on the optical cross-coupling between the internal cores in the fiber. Fabrication of such multicore fibers to tight tolerances is very difficult.

U.S. Pat. No. 4,295,738 issued Oct. 20, 1981 to Gerald Meltz, et al discloses an optical fiber, having at least two cores positioned in a common cladding, fabricated to be responsive to strain or hydrostatic pressure (but not to temperature) through the selection of materials, spacing and shape of the cores and cladding of the fiber. U.S. Pat. No. 4,295,739 issued Oct. 20, 1981 to Gerald Meltz, et al discloses the same multi-core optical fiber, with a plurality of cores positioned across the diameter of a common cladding, optimized to respond to either temperature or strain by the selection of materials, spacing and the shaping of the cores in the fiber. Meltz, et al teaches the use of cores, having cylindrical or elliptical cross-section, embedded in a common cladding so that the optical cross-talk between cores varies as a known function of fiber temperature and pressure. The fiber and core dimensions are selected so that light propagation in each core is limited to the lowest order $He_{11}$ mode in a manner well-known in the art.

The Meltz, et al invention suffers from two problems associated with limitations of the fabrication process. First, the coupling between fibers having a circular or elliptical cross-section is very sensitive to the exact cross-sectional dimensions and relative location of the cores. This means that the internal core dimensions within the fiber must be controlled both in position and shape to very tight tolerances over the length of the optical fiber sensor, which may be substantial. Errors in position and shape act to severely reduce distributed sensor performance. Second, the degree of cross-coupling between cylindrical or elliptical cores is limited by the curved shape of a core and the relatively large distance between the cores. The Meltz, et al invention is unavoidably limited in performance and sensitivity because of these limitations on core cross-coupling. This cross-coupling can be significantly increased to improve sensitivity only by making the cores strongly elliptical and reducing the distance between adjacent cores to a very low value. The difficulty in maintaining necessary fabrication tolerances forces the manufacturer to limit the core ellipticity and separation, which limits the available performance sensitivity of such multi-core fibers.

U.S. Pat. No. 4,461,536 issued Jul. 24, 1984 to Herb J. Shaw, et al discloses a transducer for use as an accurate sensor of physical parameters such as temperature and pressure. Shaw, et al overcomes the above limitations on cross-coupling, but he does so by using two fibers which are shaved and placed together in a jig to sense minute displacements. This displacement sensing capacity is then used to sense temperature and pressure from secondary sensors serving to convert temperature and pressure into minute displacements. Shaw, et al does not suggest that his method of shaving two single-core fibers and placing them together in a jig has any application to distributed fiber-optic sensors of significant length.

As noted above, distributed fiber optic sensors are known in the art to be useful for detecting structural flaws in composite structures by positioning sensing fibers within the structure during manufacture and examining the sensor output to detect structural failure.

U.S. Pat. No. 3,910,105 issued Oct. 7, 1975 to Donald A. Hoffstedt discloses such a method as does U.S. Pat. No. 4,836,030 issued Jun. 6, 1989 to David A. Martin. The prospects of applying distributed fiber optic stress and temperature sensors to the real-time monitoring of composite structures is a strong incentive for development of very long fiber-optic distributed sensors having sensitive and reliable capability for measuring temperature and stress.

The compatibility of optical fiber sensors with composite materials permits installation of internal monitoring devices prior to curing of the composite. Proper installation of the optical fiber sensor within the laminate should provide a void-free component with minimal disturbance to the pattern of the reinforcement filaments. Such an installation provides quantitative real-time measures of the stress conditions in the composite structure.

It is known in the art that intrinsic-distributed sensor systems can be fabricated using one of two different types of dual-mode optical fibers. The first type is the twin-core fiber discussed above, and the second type is the dual-mode birefringent optical fiber. In both cases measurements are conducted on the differential phase shifts between two modes. This relative phase change appears as a cross-talk change in the twin core fiber and a polarization change in the birefringent fiber. As known in the art, operation at multiple wavelengths serves to resolve two parameters. For instance, the twin-core fiber can measure temperature and strain simultaneously, while the birefringent fiber can measure the strains necessary for a two-dimensional stress analysis.

The twin-core fiber sensor is quite different from the birefringent device. The twin-core fiber has two matched single-mode cores which are very closely spaced. When one core is illuminated, both symmetric and antisymmetric modes of the fiber are equally excited and light couples back and forth between the cores as it propagates along the fiber. Complete power transfer takes place over a distance defined as the beat length of the dual mode interference pattern which is linearly distributed along the sensor. The variation in light intensity in each core is a periodic function of the beat. In general, both the beat length and beat phase vary with temperature and strain. Temperature and strain can be measured simultaneously by detecting the response in the core contrast ratio at two wavelengths.

SUMMARY OF THE INVENTION

The disclosed invention specifically involves an optical waveguide having a split-core positioned in a common cladding so that the light transmitted along the waveguide is coupled between the two halves of the split-core as a result of strain, temperature or hydrostatic pressure, thereby acting as a temperature or pressure sensor. It is the object of the present invention to provide an optical waveguide useful for measuring changes in hydrostatic pressure or temperature and a method for fabricating the same. It is a further object of the present invention to provide a fabrication method simpler than the method known in the art for fabricating optical fibers having two or more cores in a common cladding. It is also an object of the present invention to provide an optical sensor capable of coupling with other fibers more easily than multi-core fiber optic sensors known in the art and having more sensitivity than such fibers known in the art.

According to the present invention, an optical fiber is fabricated having a split-core to optimize the response to the variations in either hydrostatic pressure or temperature or both. A significant feature of the present invention is that an optical fiber having a split-core can be fabricated so that cross-talk between the two halves of the split-core is a function of hydrostatic pressure or of temperature variation. This is so because light energy propagated along one-half of the split-core is coupled to the adjacent half because of the geometry and spacing between the two halves. The present invention provides a split-core fiber with all of the advantages of the twin-core fiber known in the art and with the new advantages of (a) easier fiber fabrication to closer tolerances, (b) much tighter coupling between the two halves of the split-core, (c) improved control over diffusion across the boundary between core and cladding, and (d) improved fiber birefringence.

The method of fabricating a fiber having a split-core is a significant feature of the present invention. This method represents a significant improvement over the methods known in the art for fabricating twin-core or multi-core fibers because the present invention allows very precise control over intercore coupling with little increase in expense or difficulty over similar methods preferred in the art for fabricating single-core optical fibers. Moreover, the present method is suitable for fabricating a split-core fiber with a different index of refraction for each of the two half-cores and/or an index of refraction for the separating layer that is different from the index of refraction for the cladding layer. This flexibility provides many new options to the fiber optic sensor designer. As with the twin-core fiber sensor known in the art, each half-core of the present split-core invention is fabricated to operate with a single propagation mode.

The essential advantage of the present invention is the precise control over intercore coupling during fabrication made possible by the split-core geometry. First, the two core-halves are coupled over the entire diameter of the core, a geometric condition superior to dual elliptical core geometry. Second, the gap separating the two core-halves is uniform over the entire core diameter and can be made arbitrarily small according to the fabrication method taught by the present invention. Because of the geometric symmetry of the split-core cross-section, the atomic interdiffusion that occurs during the fiber drawing process is less severe than the same interdiffusion experienced during the drawing of twin-core or multi-core fibers. This interdiffusion phenomenon causes atomic diffusion in both directions across a core/cladding interface during the high-temperature drawing process, resulting in a smoothing of the refraction index profile from step-wise to a graded profile. The extent of smoothing is a strong function of the fiber draw conditions: specifically, the temperature and time that the preformed rod is in the hot zone, together with interdiffusion constants of the system. Split-core geometry allows the use of fiber drawing techniques designed to minimize interdiffusion because the step-wise refractive index profile of the preformed rod can be obtained by assembly alone without the pre-melt or predraw diffusion steps required for drawing multicore fibers.

Finally, a further advantage of the present invention is the ease of coupling the two half-cores to another optical fiber for optical signal transmission purposes. The split-core geometry is well-suited for splitting and forming into an optical directional coupler during the fiber drawing process.

BRIEF DESCRIPTION OF THE DRAWINGS

These and other advantages of the present invention are best understood from the following detailed description of a preferred embodiment taken in conjunction with the referenced drawings, wherein.

DESCRIPTION OF THE PREFERRED EMBODIMENT

Figure 1:
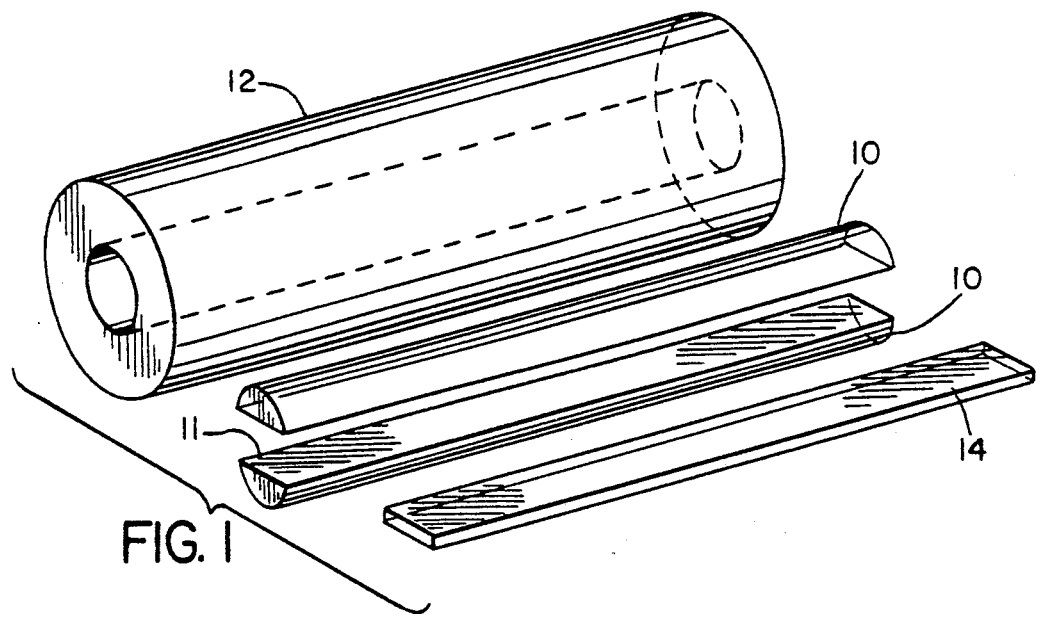
FIG. 1 is an oblique view of the optical glass preformed sections showing the cladding cylinder, the two halves of the split-core and the flat separating strip according to a preferred embodiment of the invention.
Figure 2:
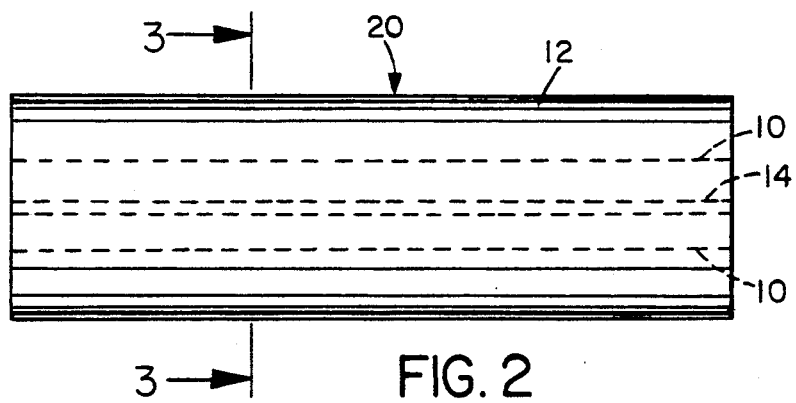
FIG. 2 shows a plan view of the assembled preform rod.
Figure 3:
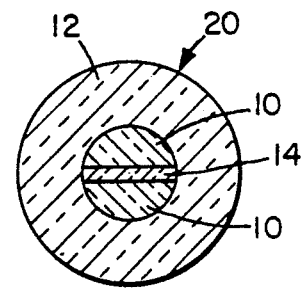
FIG. 3 is a section of the split-core optical fiber on the lines 3—3 of FIG. 2.

FIGS. 1-3 of the drawings illustrate the various parts of a fiber-optic sensor according to a preferred embodiment of the present invention. In FIG. 1, the parts are shown separately prior to assembly. FIGS. 2 and 3 illustrate the assembled fiber, which comprises two hemi-cylindrical optical glass cores 10 with their flat faces 11 facing one another, and with a flat glass strip 14 sandwiched between flat faces 11. A cladding cylinder 12 surrounds the sandwiched cores and strip.

One method for fabricating a split-core glass fiber according to the present invention comprises the following steps. First, a cylindrical rod of optical glass is split in a length-wise direction to form two hemi-cylindrical pieces 10 having substantially identical cross-sections. Two half-cylinders 10 may be split from the same rod or from two different rods having different indexes of refraction. Half-cylinders 10 are inserted into hollow cladding cylinder 12 and flat optical glass strip 14 of width equal to the diameter of split rod 10 is slipped between them. The cladding cylinder serves to hold the parts together prior to the heating and drawing step. The relative refraction indexes and the thickness of strip 14 is chosen to provide the desired intercore coupling after the rod is drawn to the final fiber diameter. The assembled rod is drawn to its final diameter adapting techniques known in the art for drawing optical glass rods having the desired cross-sectional refraction index profile. The final separation could be about 0.9 microns, for instance.

Normally, half-cylinders 10 have one index of refraction and cladding cylinder 12 and strip 14 have a second index of refraction, which is different from said first index of refraction. The insertion of the split rod assembly into cladding cylinder 12 forms a four-piece assembly with no significant gaps. This lack of gaps is an essential feature of this method because the essentially gapless assembly illustrated in FIGS. 2 and 3 may be drawn without the premelting steps required to collapse air gaps found in the cross-section of preforms used in the prior multicore fiber art. The assembly 20 in FIG. 3 is heated and drawn to form an annealed split-core fiber of the desired circumference.

This split core fiber can be used to sense strain or pressure change, or temperature changes, by monitoring the relative intensity of light emerging from the two core halves, in a similar manner to that known in the art for two-core fibers.

The following discussion discloses the theoretical performance limits for a split-core optical fiber having two single-mode half-cores separated by a small spacer and surrounded by a cladding layer. Such a fiber with a coupling coefficient K and a length L will transfer light from one half-core to the other as the light propagates along the fiber. However, under pressure, the transmitted light deflects to the original core because of the effect of refraction index changes on crosstalk, so that monitoring of light emerging from the cores provide an indication of pressure changes. Crosstalk or waveguide coupling may be better understood by considering the process according to coupled mode theory. Coupled mode theory is well-known in the art and can be reviewed by reference to, for instance, A. Yariv, P. Yeh, *Optical Waves in Crystals*, Wiley & Sons, New York, 1984 (Chapter 11). Let $\epsilon_a(x,y)e^{i(\omega t - \beta_a z)}$ and $\epsilon_b(x,y)e^{i(\omega t - \beta_b z)}$ be the modes of propagation in the two individual half-core waveguides (a and b) when they are far apart and have no coupling where:

(x,y) = the plane transverse to the propagation direction
z = propagation direction
$\beta$ = propagation constant
$\omega$ = angular frequency
t = time The electric field in the coupled-guide structure can be approximated by $$E(x,y,z,t) = A(z)\epsilon_a(x,y)e^{i(\omega t - \beta_a z)} + B(z)\epsilon_b(x,y)e^{i(\omega t - \beta_b z)} \quad (1)$$

Let $n^2(x,y)$ be the refractive index distribution of the split-core waveguide structure. Therefore, $$n^2(x,y) = n_s^2(x,y) + \Delta n_a^2(x,y) + \Delta n_b^2(x,y) \quad (2)$$

where:
$n_s^2(x,y)$ = refractive index distribution of cladding medium
$\Delta n_a^2(x,y)$ represents the presence of waveguide (a)
$\Delta n_b^2(x,y)$ represents the presence of waveguide (b)

Thus, the individual waveguide modes $\epsilon_a(x,y)$ satisfies the equations:

$$\left| \frac{\delta^2}{\delta x^2} + \frac{\delta^2}{\delta y^2} + \frac{\omega^2}{c^2}(n_s^2(x,y) + \Delta n_\alpha^2(x,y)) \right| \epsilon_\alpha(x,y) = \beta_\alpha^2 \epsilon_\alpha(x,y) \quad (3)$$

Where $\alpha = a,b$

The presence of waveguide b imposes a dielectric perturbation $\epsilon_o \Delta n_b^2(x,y)$ on the propagation of the modes $\epsilon_a(x,y)e^{i(\omega t - \beta_a z)}$ and vice versa. The total electric field in equation (1) must obey the wave equation, as shown below:

$$\left| \frac{\delta^2}{\delta x^2} + \frac{\delta^2}{\delta y^2} + \frac{\delta^2}{\delta z^2} + \frac{\omega^2}{c^2} (\Delta n_a^2(x,y) + n_s^2(x,y) + \Delta n_b^2(x,y)) \right| E = 0 \quad (4)$$

To obtain the coupled equation for the mode amplitudes A(z) and B(z), we may substitute equation (1) in equation (4) and use equation (3) while assuming "slow variation" of mode amplitudes over z. Note that "slow" here means that the fractional change of mode amplitudes over one wavelength is <<1. These adjustments lead to:

$$\frac{dA}{dz} = -iK_{ab}Be^{i(\beta_a-\beta_b)z} - iK_{aa}A \quad (5)$$

$$\frac{dB}{dz} = -iK_{ba}Ae^{-i(\beta_a-\beta_b)z} - iK_{bb}B$$

Where, $$K_{ab} = \frac{\omega\epsilon_o}{4} \int \epsilon_a^* \cdot \Delta n_a^2(x,y)\epsilon_b \, dxdy \quad (6)$$

$$K_{ba} = \frac{\omega\epsilon_o}{4} \int \epsilon_b^* \cdot \Delta n_b^2(z,y)\epsilon_a \, dxdy$$

and $$K_{aa} = \frac{\omega\epsilon_o}{4} \int \epsilon_a^* \cdot \Delta n_b^2(x,y)\epsilon_a \, dxdy \quad (7)$$

$$K_{bb} = \frac{\omega\epsilon_o}{4} \int \epsilon_b^* \cdot \Delta n_a^2(x,y)\epsilon_b \, dxdy$$

The terms in $K_{aa}$ and $K_{bb}$ result from the dielectric perturbation to one of the waveguides caused by the presence of the other waveguide. These terms represent only a small correction to the propagation constant $\beta_a$ and $\beta_b$, respectively. The terms in $K_{ab}$ and $K_{ba}$ represent the exchange coupling between the two waveguides. So, if we write the total field of equation (1) as:

$$E = A(z)\epsilon_a e^{i[\omega t-(\beta_a+K_{aa})z]} + B(z)\epsilon_b e^{i[\omega t-(\beta_b+K_{bb})z]}$$

Equations (5) then become $$\frac{dA}{dz} = -iK_{ab}Be^{-i2\delta z} \quad (8)$$

$$\frac{dB}{dz} = -iK_{ba}Ae^{-i2\delta z}$$

where
$$2\delta = (\beta_a+K_{aa})-(\beta_b+K_{bb})$$

The solution of coupled differential equations (8) is:

$$A(z) = e^{i\delta z}(A_1 e^{iSz} + A_2 e^{-iSz})$$

$$B(z) = \frac{-e^{-i\delta z}}{K_{ab}} ((\delta+S)A_1 e^{iSz} + (\delta-S)A_2 e^{-iSz}) \quad (9)$$

where $S = (\delta^2 + K_{ab}K_{ba})^{\frac{1}{2}}$ and $A_1, A_2$ are arbitrary constants with values determined by the boundary conditions along z appropriate to the problem.

The power carried in each mode is proportional to the magnitude-squared of the coefficients A(z), B(z). Let $P_o$ and zero be the power in waveguide a and b at z=0 respectively, so $A(0)=A_o$, and $B(0)=0$. In the case of identical parallel waveguides, where $K_{ab}=K_{ba}=K$, we have $$P_a(z) = P_o - P_b(z)$$

$$P_b(z) = P_o \frac{K^2}{K^2+\delta^2} \sin^2(K^2+\delta^2)^{\frac{1}{2}} z \quad (10)$$

where $P_o = |A(o)|^2$ is the power in mode a at z=0.

Complete power transfer occurs in a distance $L = \pi/2K$ provided that $\delta=0$. The maximum fraction of power that can be transferred is $K^2/K^2+\delta^2$ from equation (10) and this value becomes negligible as $\delta >> K$.

For significant mode coupling or crosstalk to take place between modes a and b, as is required for sensor operation, two conditions must be satisfied. First, the kinematic condition ($\delta=0$), which requires that each sensor waveguide be identical to its partner. Second, the coupling of coefficients ($K_{ab}$ and $K_{ba}$) must not vanish.

Figure 5:
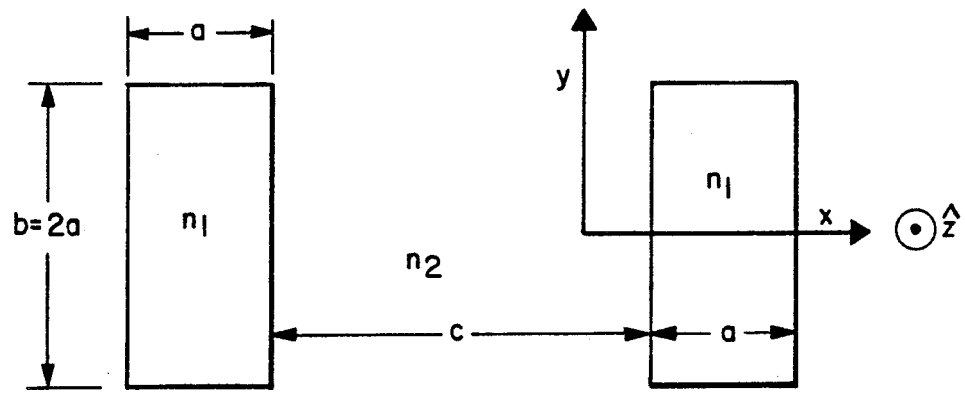
FIG. 5 shows a schematic of the rectangular waveguide approximation of two split-cores of radius "a" separated by distance "c"
Figure 4:
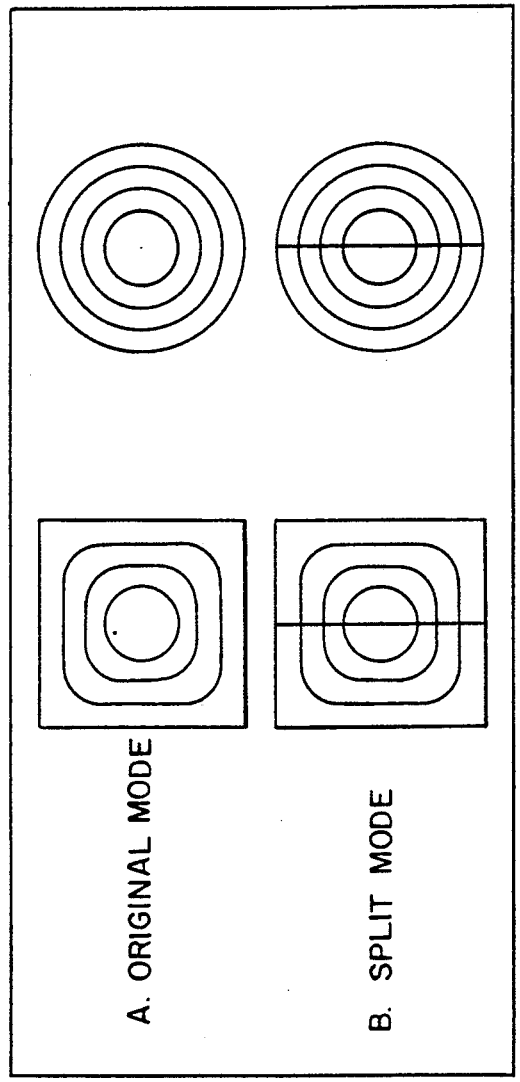
FIG. 4 shows idealized primary mode intensity contours for square and round waveguide cross-sections, for solid and split cores.

To simplify the analysis of two identical split-core fiber coupling coefficients, consider the square cross-sectional waveguide and a circular waveguide having intensity contours for their lowest modes as depicted in FIG. 4A. If each waveguide comprises two halves and the two halves are placed in contact to assume the original shape as depicted in FIG. 4B, we may expect the same intensity contours for these four waveguides as we noted for the solid cores in FIG. 4A. With this insight, we can see that if the two halves of a split cylindrical core are close enough to each other for a significant level of crosstalk, they can be approximated by two adjacent rectangular waveguides of sides 2a and a, where a is the radius of the cylindrical core, as depicted in FIG. 5.

A dielectric core of rectangular cross-section (a by b), surrounded by a different cladding supports two families of hybrid modes as is well-known in the art. Rectangular mode propagation can be reviewed by reference to, for instance; E. A. J. Marcatili, "Dielectric Rectangular Waveguide and Directional Coupler for Integrated Optics", Bell Syst. Tech. J., Vol 48, pp 2017-2102, Sept., 1969, or L. Eyges, P. W. Inersteiner, "Modes of an Array of Dielectric Waveguides", J. Opt. Soc. Am., Vol. 71, No. 11, Nov., 1981. These two hybrid mode families are essentially TEM modes polarized either in the x or the y direction and may be labelled as $E_{pg}^x$ and $E_{pg}^y$. The subscripts (p and q) give the number of extrema (in the x and y direction, respectively) of the magnetic or electric transverse field components.

Figure 6:
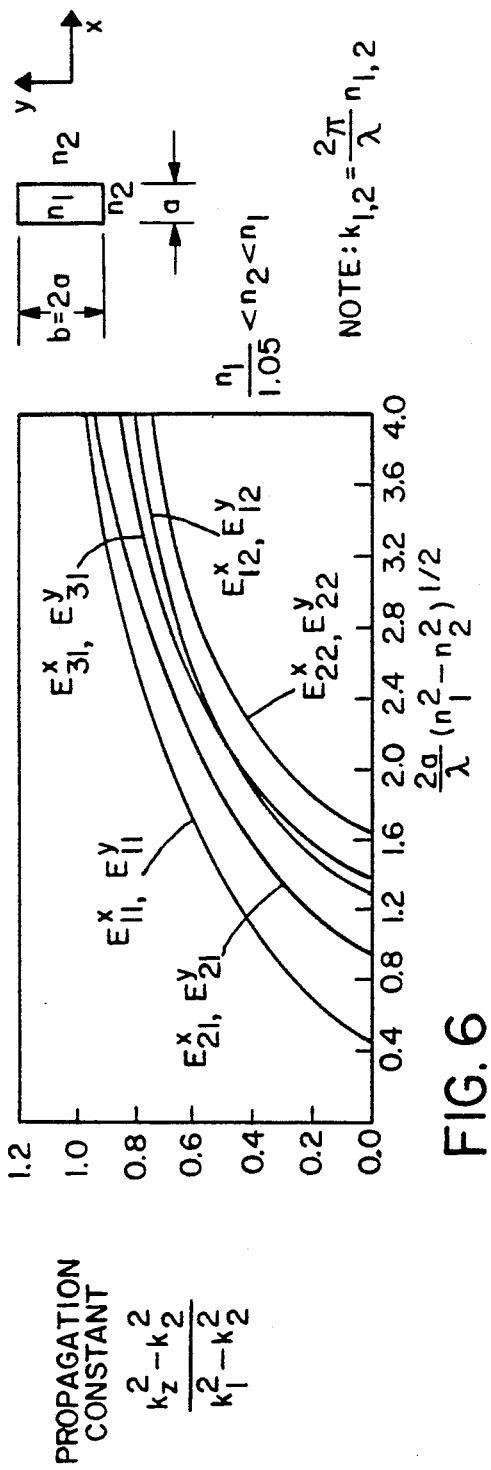
FIG. 6 shows the dispersion curve for rectangular waveguides having sides "a" and "b"=(2a) showing the propagation constant for several propagation modes.

The dispersion curve for waveguides of sides a and b=2a from Marcatili is reproduced in FIG. 6. Typical values of b for waveguides capable of supporting only the fundamental modes $E_{11}^x$ and $E_{11}^y$ range from 19 $\lambda/n_1$ for $n_1/n_2=1.001$ to 1.21 $\lambda/n_1$ for $n_1/n_2=1.5$.

Because the field is not confined, there is coupling between two of these waveguides. Design curves for coupled waveguide structures from Marcatili are reproduced in FIG. 7 where coupling coefficient K is defined as:

$$K = \frac{\pi}{2L} = \frac{\omega\epsilon_0}{4} \int \epsilon_a^* \cdot \Delta n_a^2(x,y)\epsilon_b\, dx dy \quad \text{(see Equation 6)}$$

and

Figure 7:
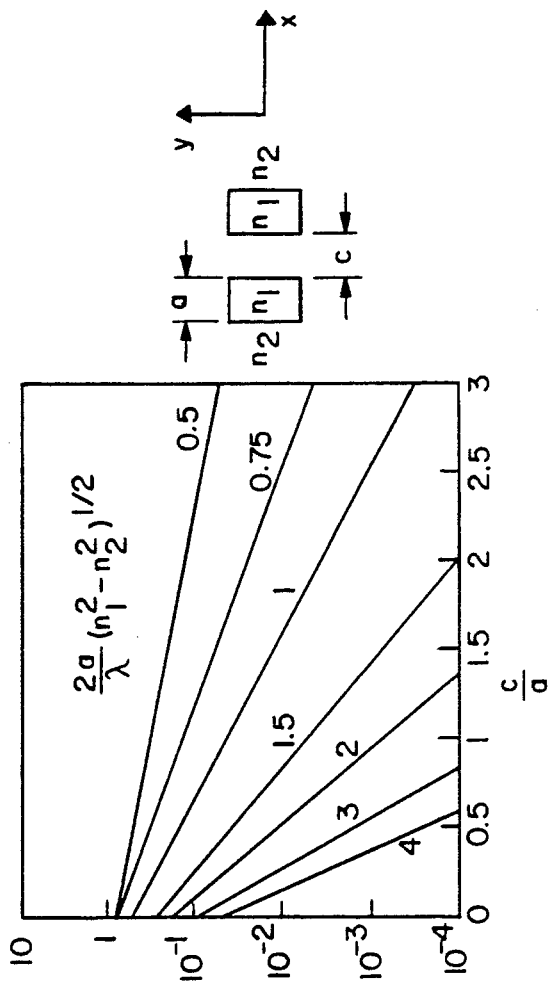
FIG. 7 shows the coupling coefficient for several propagation modes for rectangular waveguide structures coupled across a separation "c"

|K| = Coupling Coefficient
$k_z$ = Propagation Constant
$k_1 = k_o n_1 = 2\pi/\lambda\, n_1$ To better understand the meaning of the curves in FIG. 7, consider an example. Assume $n_1 = 1.5$, $n_2 = 1.5/1.01 = 1.485$, and $b = 2a$. To insure that each waveguide supports only the $E_{11}^x$ and $E_{11}^y$ modes, the normalized dimension a, according to FIG. 6, must be chosen as $2a/\lambda\ (n_1^2 - n_2^2)^{\frac{1}{2}} = 0.75$. Consequently, $a = 1.78\lambda$, $b = 3.56\lambda$ and $k_z/k_1 = 1$. From FIG. 7, we obtain the coupler length (L) for complete power transfer: $L = 159\lambda$ (for $c = a$) and $L = 46\lambda$ (for $c = a/4$).

The length necessary for 3 dB coupling is $L/2 = 23\lambda$ according to equation (10). This length increases exponentially with the separation between the waveguides.

The mechanism for coupling optical energy from one waveguide to an adjacent waveguide is a strong function of the ratio of refraction indices for the core and separation of cladding materials. A small change in the refractive index between the waveguides, such as would occur with a change in pressure, modifies the coupling. Such coupling modification occurs upon stress of the medium between the waveguides.

For $E_{11}^x$ and $E_{11}^y$ modes, the ratio between couplings for two values of the refractive index in the cladding region between the waveguides ($n_2$ and $n_2(1+\delta)$) can be written as $$\frac{K_1}{K_2} = \frac{L_2}{L_1} = \exp\left\{-\pi\left(\frac{n_1^2}{n_2^2} - 1\right)^{-1}\frac{c\delta}{A}\left[1 - \left(\frac{2}{\pi} + \frac{a}{A}\right)^{-\frac{1}{2}}\right]^{\frac{1}{2}}\right\}$$

That ratio is $\frac{1}{2}$ if $$\delta = 0.22\left(\frac{n_1^2}{n_2^2} - 1\right)\frac{A}{c}\left[1 - \left(\frac{2}{\pi} + \frac{a}{A}\right)^{-2}\right]^{-1} \quad (11)$$

Where, $$A = \frac{\pi}{(k_1^2 - k_2^2)^{\frac{1}{2}}} = \frac{\lambda}{2(n_1^2 - n_2^2)^{\frac{1}{2}}}$$

A split-core fiber with coupling coefficient $K_1$ and length $$L = \left(\frac{\pi}{|2K_1|}\right)$$

transfers all the optical power from the input waveguide to the adjacent waveguide. If the refractive index of the medium between the waveguides is changed by external pressure from $n_2$ to $n_2(1+\delta)$ such that equation (11) is satisfied, the power instead emerges from the input waveguide.

For example, if $n_1 = 1.5$, $n_2 = 1.4581$, $A = 0.75$, $a = 1.78\lambda$ and $c = a$, new values for $n_2$ under pressure becomes $1.0048 \times 1.4581 = 1.4923$. With this value, deflection of the light back to the input core is possible.

Thus, a split-core fiber with a coupling coefficient K and a length $$L\left(=\frac{\pi}{2K_1}\right)$$

should transfer light from one half-core to the other. Under pressure, the same fiber should deflect transmitted light back to the original half core because of the refractive index of the cladding layer changes from 1.4581 to 1.4923.

Figure 8:
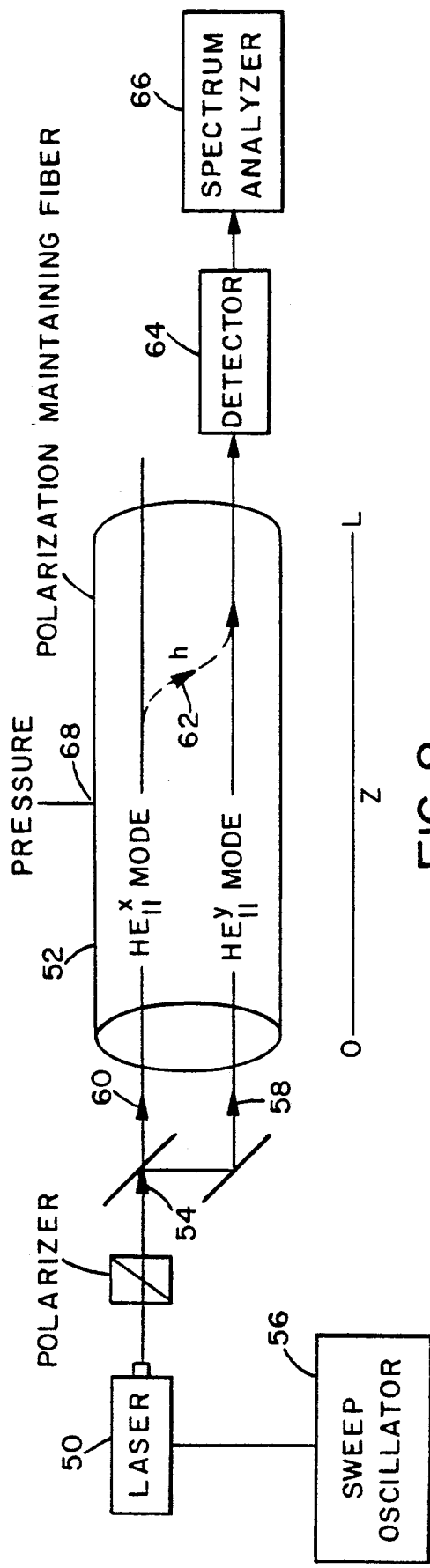
FIG. 8 discloses an exemplary optical system based on a two-beam interferometer comprising a monochromatic light source and a polarization maintaining fiber.

A split-core fiber is also very useful in an intrinsic distributed optical fiber pressure sensor as a linear polarization maintaining fiber. The pressure-induced mode-coupling along the length of a fiber causes changes in polarization as the light propagates along the fiber because of transfer of the polarized components between the two half-cores. The application of single core polarization maintaining fibers is known in the art and may be further investigated by consulting, for instance, T. G. Giallorenzi, et al., "Optical Fiber Sensor Technology," *IEEE J. Quantum Electron.*, QE-18, pp 626–665, 1982. An optical system based on a two-beam interferometer comprising a highly monochromatic light source 50 and a polarization maintaining fiber 52 is depicted in FIG. 8.

In the exemplary system a light beam 54 from laser 50 is sawtooth modulated in frequency by oscillator 56 and separated into two beams 58 and 60. Beams 58 and 60 are launched into the respective halves of the polarization maintaining fiber and they propagate in the respective $HE_{11}^x$ and $HE_{11}^y$ modes. As beams 58 and 60 propagate along fiber 52, the primary mode energy from each beam couples to the adjacent half-core waveguide, as shown at 62 in FIG. 8. After traveling over distance L, the portion of the energy in beam 60 transferred to the adjacent half-core is detected at the output end of fiber 52 by a detector 64 and a spectrum analyzer 66. Pressure applied at point 68 on fiber 52 will change the amount of beam 60 energy transferred (illustrated at 62) and the resulting change is detected at detector 64. Information on location and intensity of pressure at point 68 can be extracted from the interference caused by the $HE_{11}^y$ mode components emerging from the fiber after passing through analyzer 66.

An external force F is applied at distance z along the fiber, measured from fiber's input end. The electric field at the detector is equal to the sum of the electric field ($E_{yy}$), which propagates the fiber in the $HE_{11}^y$ mode, and the field ($E_{xy}$), which is transferred from the $HE_{11}^x$ mode to the $HE_{11}^y$ mode at location z. Because of the difference in traveling time, the two fields will have different frequencies. The interference of two fields of different frequencies will produce a beat frequency $\Omega$ equal to the frequency difference.

The delay time r between the modes at z is given by $$\tau = t_1 - t_2 = \frac{z}{v_1} - \frac{z}{v_2} = z\frac{d(\Delta\beta)}{d\omega} = zT_p$$

where $v_1$, $v_2$ are group velocities of the two modes, $\Delta\beta = \beta_1 - \beta_2$ is the propagation constant difference, and $T_p$ is polarization dispersion.

During delay time r, the optical frequency changes by $$\Omega = \frac{d\omega}{dt}\tau.$$

This beat frequency component can be observed in the detector signal. Its frequency $$\Omega = \frac{d\omega}{dt}zT_p$$

marks position z on the fiber, and its amplitude is proportional to the local mode coupling factor h and total amplitude attenuation factor $e^{-\alpha L}$ of propagation through the fiber length L.

To determine the available resolution in z, or the distance between two peak points along the fiber length, the following equation is used:

$$\Delta z = \frac{\Delta \Omega}{\frac{d\omega}{dt}T_p}$$

(resolution capacity assuming linear sweep)
Where
$\Delta\omega$ is spectrum analyzer resolution $$\frac{d\omega}{dt}\tau = \text{frequency sweeping rate}$$

$T_p$ = polarization dispersion $\approx B/C$
$B = \Delta n$ = fiber birefringence
$c$ = speed of light For a 1 Hz resolution spectrum analyzer, a frequency-sweeping rate of 1 GHz/s and a polarization dispersion of $10^{-11}$ s/m, we have a resolution capacity of $\Delta z = 1/10^9 \times 10^{-11} = 100$ meters. However, because a typical split-core fiber birefringence is expected to be $10^{-1}$, $T_p = \Delta n/c - 10^{-9}$ s/m instead of $10^{-11}$ s/m for a polarization maintaining fiber and the resolution in z for a split-core fiber would be one meter. This would be a 100 times improvement in longitudinal resolution available from the exemplary measurement system depicted in FIG. 8 over prior art. A higher-resolution spectrum analyzer and a faster sweeping rate would allow centimeter resolutions with the improved polarization dispersion of split-core fibers.

The dimensional limitations for single-mode split-core fibers can be examined using Maxwell's equations and the boundary conditions for perfect symmetrically-split cylindrical cores. The necessary mathematical procedures are well-known in the art and can be shown to provide a limiting inequality for single-mode propagation of $$a < \lambda/(n_1^2 - n_2^2)^{\frac{1}{2}}$$

Where:
a = core radius
$\lambda$ = wavelength in the core = $2\pi c/\omega$
$n_1$ = index of refraction in core
$n_2$ = index of refraction in cladding layer Thus, for $n_1 = 1.77817$ and $n_2 = 1.75607$, the core radius must not exceed $3.58\lambda$ if propagation is to remain exclusively in a single mode. For $\lambda = 0.632$ microns, the core radius must be less than 2.26 microns.

From the preceding teachings, it can be seen that a split-core optical fiber should provide a substantially improved means for sensing pressure or temperature over the length of the fiber. This fiber can function in these capacities either as a twin-core fiber or a polarization-maintaining fiber. The fiber can be coupled more easily to other fibers in an optical circuit. Fabrication of a twin-core fiber sensor is much simplified according to the above teachings. Fiber geometry and refractive profile characteristics are controllable to very close tolerances according to the fabrication method and geometry disclosed.

It will be seen that the objects set forth above and those made apparent from the foregoing description are efficiently attained. All matters contained in the foregoing description or shown in the accompanying drawings are intended to be interpreted as illustrative and not as limiting.

I claim:

1. A split-core fiber, suitable for use as an optical transmission line or a physical sensor, comprising:
   two substantially hemi-cylindrical optical glass cores, the first said core having a first index of refraction and the second said core having a second index of refraction, separated by a layer of optical glass having a third index of refraction;
   an outer optical glass sheath having a fourth index of refraction; and
   wherein said third and fourth indices of refraction are substantially identical.

2. The split-core fiber of claim 1 wherein said first and second indices of refraction are substantially identical.

* * * * *